Nov. 7, 1933.　　　　　L. A. WIGGINS　　　　　1,934,022
PIPE FITTING
Filed March 19, 1931
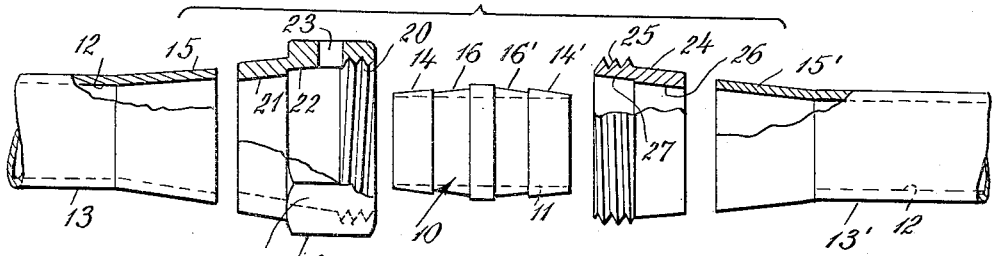
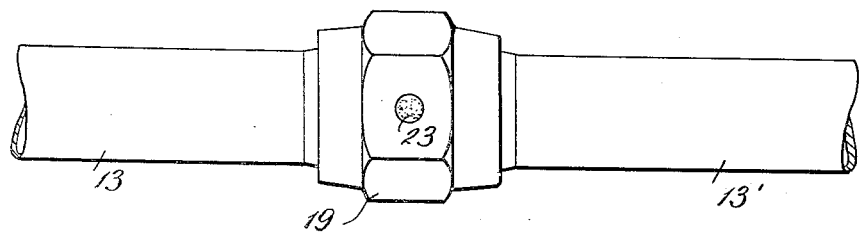
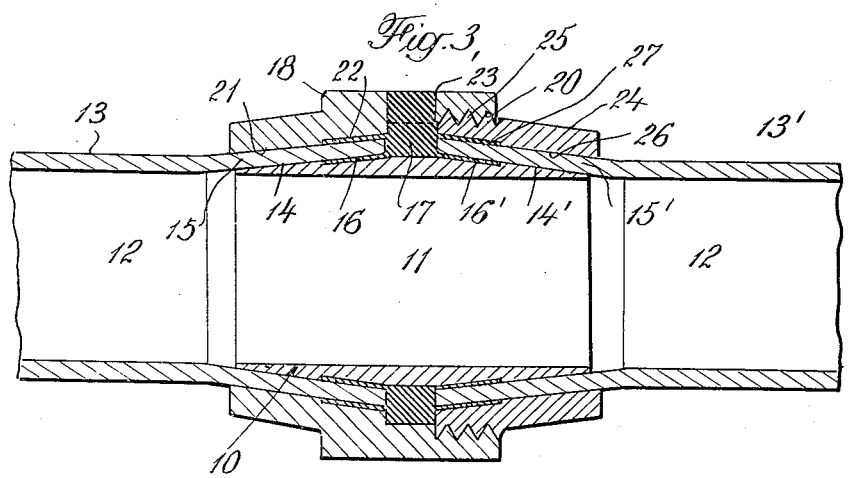
INVENTOR
Leslie A. Wiggins
BY
ATTORNEYS Patented Nov. 7, 1933

1,934,022

UNITED STATES PATENT OFFICE 1,934,022

PIPE-FITTING

Leslie A. Wiggins, Rome, N. Y., assignor to Revere Copper & Brass Incorporated, Rome, N. Y., a corporation of Maryland Application March 19, 1931. Serial No. 523,774

3 Claims. (Cl. 285—79)

This invention relates to pipe-fittings and has for its object certain improvements in pipe-fittings. The invention relates more perticularly to an improved pipe coupling, union, expansion-pipe sleeve or the like.

Numerous proposals have been advanced in the art of pipe couplings to provide a device that will permit the joining of pipe sections or pipe fittings non-leakably. It is not uncommon, for example, to join two pipe sections by threading adjacent ends and then fitting a threaded sleeve over the pipe ends. An extremely tight fit is required to make the joint non-leakable; and the pipe material employed must lend itself to the type of threading required. This practice has the inconvenience that considerable threading must be done on the job, which is often inconvenient and expensive at best.

Pipe-fittings or couplings have likewise been proposed to avoid the type of joint just described, recourse being had to the use of a molten metal to seal the joint. In this type of structure, an outer slidable sleeve member is generally employed. For example, it has been proposed to insert the straight ends of two pipe sections into an unthreaded outer sleeve member, and then to pour a molten sealing metal through an opening in the sleeve to and between the outer surface of the pipe sections and the inner surface of the outer sleeve member. Due to expansion and contraction effects or rough handling and the like, such joints are apt to leak sooner or later.

As a result of my investigations, I have determined that a pipe coupling may be constructed that may be quickly employed on the job, without any additional threading operations, while at the same time making possible a joint that will not leak under normal operating conditions.

The type of construction contemplated by the present invention may perhaps be better understood if reference is made to the accompanying drawing, taken in conjunction with the following description, in which:

Fig. 1 is a longitudinal part section of a pipe fitting illustrative of the invention; the parts being shown in a non-assembled manner;

Fig. 2 is an outside view of the pipe fitting of Fig. 1, shown in a coupled or assembled condition; and Fig. 3 is a longitudinal section, in enlarged detail, of the fitting shown in Fig. 2 in its assembled form.

The pipe fitting shown comprises an inner sleeve or male member 10. It is un-threaded. Its internal passageway 11 has a diameter the same, or approximately the same, as that, 12, of a pipe section 13, or 13', to which attachment is to be made. The inner surface of the sleeve is preferably smooth.

An outside tapering seat 14, or 14', formed by a conical end section is provided at the end of the sleeve, which is adapted to hold a flared end section 15, or 15', of the pipe sections. This seat is circumferential, and the inside contour of the flared pipe section should fit snugly thereon.

An annular groove or recessed portion 16, or 16', adjacent the seat is provided on the exterior of the inner sleeve member, which is adapted to receive a sealing material, such as molten solder 17. This groove or recess should be so located that a portion of the flared end of the inserted pipe section may extend in whole or in part over the same, as indicated in Fig. 3, to provide a more efficient seal.

The pipe fitting or coupling also contemplates two outer members threaded to be screwed into one another. One of said outer members 18 preferably consists of a coupling nut with a plurality of faces 19 adapted for holding a wrench. This outer member has an interior threaded end portion 20. As in the case of the inner sleeve member, a tapered seat 21 is provided at one end to hold the flared end of the pipe section. This seat is on the interior, is conical in shape, and advantageously has a contour conforming substantially to that of the seat of the inner sleeve member when in locked position with the flared pipe section.

An annular groove or recessed portion 22 is provided on the interior of the first outer member. It is advantageously located between the seat and the threaded end portion, and connects with a hole or port 23 for the introduction of the sealing material.

The other, or second, of said outer members 24 has an exterior threaded end portion 25 adapted to be screwed into the first outer member. The second outer member is also provided with a tapering seat 26 at one end thereof to hold the flared end of a pipe section. As in the case of the first outer member, the seat is on the interior, is conical in shape and likewise advantageously has a contour conforming substantially to that of the seat of the inner sleeve member when in locked position with the flared pipe section.

An annular groove or recessed portion 27 is provided in the interior of the second outer member. It is advantageously located between the seat and the end of the member, directly under the threaded portion, and connects with the hole or port of the first outer member when the two members are in locked position, so that sealing material may be introduced. In order to maintain access to the hole or port, the threaded portion of the second outer member should not extend over or beyond the hole when the members are coupled.

The pipe fitting or coupling described above may be used as follows:

The pipe sections 13 and 13' are appropriately flared to provide end sections 15 and 15', that have an angular inclination conforming substantially to that of the seats 14 and 14' of the inner sleeve member 10, and to that of the seat 21 of the first outer member 18, and to that of the seat 26 of the second outer member 24. Either before or after this flaring operation, as occasion fits, the coupling nut or first outer member 18 is stripped over the pipe section 13, and the second outer member 24 is similarly stripped over the pipe section 13'.

The inner sleeve member 10 is then appropriately brought into position. This may be accomplished by inserting the seat 14 into the flared end section 15, and by fitting the flared section 15' over the seat 14'. The first and second outer members 18 and 24, respectively, are then screwed into one another. The net result is to grip tightly the flared pipe section 15 between the seats 14 and 21, and the flared pipe section 15' between the seats 14' and 26. As pointed out above, it is advisable to have the flared ends 15 and 15' of the pipe sections sufficiently long to extend in whole or in part over the annular grooves 16 and 22, on the one hand, and the grooves 16' and 27, on the other hand.

While a substantially tight joint or coupling may be obtained in this manner, particularly when all of the seats are carefully machined, it is advisable to provide a more perfect seal by inserting an appropriate sealing material, such as molten solder through the hole or opening 23. One or more such holes may of course be used. The molten solder ultimately finds its way around the annular grooves, in juxtaposition to one another, ultimately filling them with the molten solder. A sufficient amount of solder is advantageously employed to fill all of the grooves, other open spaces, as well as the hole or port. On solidifying, the solder provides a bond that most effectively seals the joint non-leakably.

It will thus be seen that in the practice of the invention a pipe-fitting may be provided that combines in a novel manner the use of a compression joint and a solder joint. These two types of joints may, therefore, be combined in such a way as to supplement one another, the net result being to provide a joint that is substantially nonleakable, and which is very strong. Further, the elements going into the combination are so designed as to yield a pipe-fitting of pleasing contour. Certain variations in design are of course possible, while still operating within the principles of the invention.

I claim:

1. In an improved pipe coupling, the combination comprising two outer members threaded to be screwed into one another, each of said outer members being provided at one end thereof with an inside tapering seat having an annular groove therein, an inside member having tapering grooved outside surfaces adapted to cooperate with the outer members to join flared pipe ends, and one or more ports extending through at least one of the outer members in communication with said annular grooves for introducing sealing material into said grooves.

2. In an improved pipe coupling, the combination comprising an inner sleeve member having a groove in the outer surface thereof adapted to fit into a pipe, two outer members adapted to fit over the inner member to hold the ends of pipe therebetween, said groove forming an opening between the outer surface of the inner member and one of the said ends of pipe, and sealing material in said groove, the outer member having a port formed therein communicating with said groove for introducing sealing material therein.

3. In an improved pipe coupling, the combination comprising an inner sleeve member having outside surfaces tapering towards the ends with a groove in each tapering surface thereof, and two outer members adapted to be screwed together and to cooperate with the inner member to hold the flared ends of pipe, each of said outer members having a groove formed in the inner surface, said grooves forming open channels on the inner and the outer surfaces of the pipe, and sealing material in said channels.

LESLIE A. WIGGINS.